2,790,811
5-OXO-1,3-DITHIANES

Edward G. Howard, Jr., Wilmington, Del., assignor to E. I. du Pont de Nemours and Company, Wilmington, Del., a corporation of Delaware No Drawing. Application August 26, 1954, Serial No. 452,460

7 Claims. (Cl. 260—327)

This invention relates to heterocyclic sulfur compounds and to their preparation.

The preparation and properties of 4-ethoxycarbonyl-5-oxo-1,3-dithiane are described by Challenger et al., J. Chem. Soc. 347 (1939). According to these authors, treatment of this compound with 2N sodium hydroxide results in ring cleavage, with formation of methylene-his-thioacetic acid.

This invention has as an object the preparation of certain new 5-oxo-1,3-dithianes. A further object is the preparation of rancidity inhibitors for oils. Another object is the preparation of intermediates for chemical synthesis. Other objects will appear hereinafter.

These objects are accomplished by the present invention of 5-oxo-1,3-dithiane and its derivatives wherein a substituent of the class consisting of hydrocarbon radicals and halohydrocarbon radicals in which the halogen is attached to a carbon which in turn is attached to another carbon by a double bond is present on at least one of the 2, 4, and 6 carbons. The invention also includes the method of preparing these compounds wherein the corresponding acetal or thioacetal of a 4-carboxy-5-oxo-1,3-dithiane is heated at reflux with water having a pH of less than 7, decarboxylation and hydrolysis of the acetal group taking place during the process.

The acetals and thioacetals of 4-alkoxycarbonyl-5-oxo-1,3-dithianes may be made by charging a reactor with a non-oxidizing mineral acid and a mixture of a 4-alkoxycarbonyl-5-oxo-1,3-dithiane or a 5-oxo-1,3-dithiane and an alcohol or mercaptan. In the case of the alcohols, it is desirable to use a large excess of the alcohol (molar ratio of alcohol to oxo compound, 10:1 or higher) and, if the alcohol is monohydric to use it in the form of the corresponding orthoformic ester. The charge is stirred at about 25°–100° C. until reaction is complete, which requires from 30 minutes to 10 hours, depending upon the particular reactants used. The reaction product is generally crystalline and may be purified by recrystallization from such solvents as methanol, ethanol, acetic acid, etc.

The 4-alkoxycarbonyl-5-oxo-1,3-dithiane is formed by intramolecularly condensing the thioacetal formed from an aldehyde, e. g., 2-chlorobenzaldehyde, 4-nitrobenzaldehyde, etc., or ketone, e. g., acetone, diphenyl ketone, etc., and an α mercaptomonocarboxylic ester, containing a hydrogen alpha to an ester group, in solution in alcohol in the presence of a basic reagent, pouring into an ice water-strong mineral acid-ether mixture, extracting the aqueous layer with ether, drying, and distilling.

The following examples in which parts are by weight are illustrative of the invention.

EXAMPLE I

A mixture of 50 ml. of water, 0.5 ml. of concentrated hydrochloric acid, and 4 g. (0.018 mole) of the acetal, 6-carboxy-1,4-dioxa-7,9-dithiaspiro[4.5]decane,

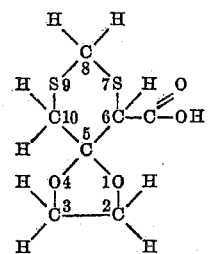

prepared as described subsequently, was heated on a steam bath for four hours. Carbon dioxide was liberated slowly and the solid gradually went into solution. A small amount of oil remained undissolved. The mixture was cooled in an ice bath to give 2.3 g. (96% of theory) of 5-oxo-1,3-dithiane,

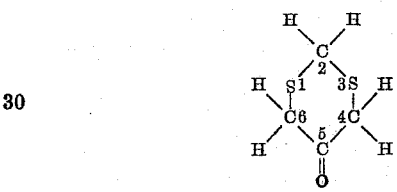

which, after recrystallization from water, melted at 100°–100.5° C.

*Analysis.*—Calculated for $C_4H_6OS_2$: C, 35.80%; H, 4.51%; S, 47.78%. Found: C, 35.94%, 36.08%; H, 4.96%, 4.82%; S, 47.98.

The infrared spectrum showed typical carbonyl bands. In water solution, an immediate precipitate was obtained with 2,4-dinitrophenylhydrazine, indicative of carbonyl groups.

The 6-carboxy-1,4-dioxa-7,9-dithiaspiro[4.5]decane used in the above example was prepared as follows:

A solution of 2.5 g. (0.01 mole) of 6-ethoxycarbonyl-1,4-dioxa-7,9-dithiaspiro[4.5]decane, prepared as described below, and 0.8 g. (0.02 mole) of sodium hydroxide in 25 ml. of water and 15 ml. of ethanol was permitted to stand overnight, and then heated on a steam bath for five hours. This removed the alcohol by evaporation and completed the saponification. The reaction mixture was allowed to cool and acidified with concentrated hydrochloric acid. The solid acid which precipitated weighed 2 g. (90% of theory). After recrystallization from water, the product, 6-carboxy-1,4-dioxa-7,9-dithiaspiro[4.5]decane, melted at 200°–201° C. with evolution of carbon dioxide.

*Analysis.*—Calculated for $C_7H_{10}S_2O_4$: C, 37.83%; H, 4.53%; S, 28.85%. Found: C, 38.19%; H, 4.59%; S, 29.07%.

The 6-ethoxycarbonyl-1,4-dioxa-7,9-dithiaspiro-[4.5]-decane was made from 4-ethoxycarbonyl-5-oxo-1,3-dithiane as follows:

A mixture of 100 ml. of ethylene glycol and 20 g. (0.10 mole) of 4-ethoxycarbonyl-5-oxo-1,3-dithiane,

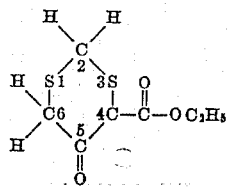

was saturated with dry hydrogen chloride and the mixture heated on a steam bath for one hour. After cooling and storage overnight at ambient temperature, there was obtained 23 g. of 6-ethoxycarbonyl-1,4-dioxa-7,9-dithiaspiro[4.5]decane, which on recrystallization from ethanol, melted at 59°–60° C.

*Analysis.*—Calculated for $C_9H_{14}S_2O_4$: C, 43.18%; H, 5.65%; S, 25.62%. Found: C, 43.39%; H, 5.76%; S, 25.66%.

The 4-ethoxycarbonyl-5-oxo-1,3-dithiane was prepared as follows:

To a solution of 0.25 mole of sodium ethoxide in 400 ml. of absolute ethanol, there was added 50.4 g. (0.2 mole) of diethyl-3,5-dithiapimelate, made as described subsequently, and the mixture heated to 75° C. for 25 minutes. After cooling, the reaction mixture was poured into an ice water/hydrogen chloride/ether mixture. The aqueous layer was extracted three times with 200 ml. portions of ether, the combined extracts dried over anhydrous magnesium sulfate, and distilled. There were obtained two fractions: (1) a liquid boiling at 109° C./016 mm. to 116° C./0.5 mm. and (2) a solid weighing 19 g., which, on recrystallization from ethanol, melted at 62°–64° C. which was 4-ethoxycarbonyl-5-oxo-1,3-dithiane.

*Analysis.*—Calculated for $C_7H_{10}S_2O_3$: C, 40.70%; H, 4.89%; S, 31.09%. Found: C, 41.42%, 40.98%, 40.67%; H, 4.96%, 4.95%, 4.83%; S, 31.65%, 31.57%.

In an alternative method of preparation one-half of a solution of 1 mole of sodium ethoxide in 600 ml. of ethanol was added to a cold solution of 252.3 g. (1 mole) of diethyl 3,5-dithiapimelate in 400 ml. of absolute ethanol. After one hour at 5° C., the remaining sodium ethoxide solution was added, the mixture allowed to stand overnight at room temperature, and then poured into an ice water/hydrogen chloride/ether mixture. The organic layer was removed and exhaustively extracted with cold aqueous sodium hydroxide. The extracts were combined, acidified with hydrochloric acid, and extracted with ether. After drying over anhydrous magnesium sulfate, the ether was removed by distillation. Crystallization from alcohol gave 57.5 g. of a white crystalline material melting at 62°–64° C.

The diethyl 3,5-dithiapimelate used in the above examples was prepared by passing dry hydrogen chloride through a mixture of 120 g. (1 mole) of ethyl mercaptoacetate and 40.6 g. (0.5 mole) of 37% aqueous formaldehyde at 10° C. The addition of the hydrogen chloride was stopped when the mixture became homogeneous. After standing one hour at 25° C., the reaction mixture was purified by pouring it into an ice-water mixture, extracting with ether, washing the extract with 5% aqueous sodium hydroxide, water, then drying over anhydrous magnesium sulfate, and distilling. There was obtained 85 g. of diethyl 3,5-dithiapimelate, boiling at 122° C./0.06 mm.

By employing other aldehydes R.CHO in place of the formaldehyde of the above there are obtained diethyl 3,5-diethiapimelates having R on the carbon in the 4 position. When these are condensed, employing sodium ethoxide as the condensing agent, there are obtained 4-ethoxycarbonyl-5-oxo-1,3-dithianes having an R substituent on the 2-carbon of the ring. Thus acetaldehyde gives the 2-methyl-, propionaldehyde the 2-ethyl-, benzaldehyde the 2-phenyl-4-ethoxy-carbonyl-5-oxo-1,3-dithianes. When a ketone, $R_2CO$, is employed instead of formaldehyde, the dithiane with two R's on the 2 carbon is the ultimate product, i. e., from acetone the 2,2-dimethyl-, from acetophenone the 2-methyl-2-phenyl-, from benzophenone the 2,2-diphenyl-4-ethoxycarbonyl-5-oxo-1,3-dithianes.

When an ester of an α-mercaptocarboxylic acid having a hydrogen on the α carbon, other than an ester of mercaptoacetic acid, i. e., one of the formula

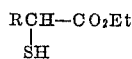

is employed, the ultimate dithiane contains R on the 4 and 6 carbons. Thus the use of α-mercaptopropionic esters results in the 4,6-dimethyl derivatives, of α-mercaptobutyric esters in the 4,6-diethyl derivatives, of α-mercaptophenylacetic acid, in the 4,6-diphenyl derivatives.

EXAMPLE II

A mixture of 12.6 g. of pure 6-carboxy-8-(o-chlorophenyl)-1,4-dioxa-7,9-dithiaspiro[4.5]decane, prepared as described subsequently, 35 ml. of absolute ethanol, 25 ml. of water, and 5 ml. of concentrated hydrochloric acid was heated and stirred at reflux (86° C.) for 16 hours. On cooling, the white solid was collected by filtration, washed first with dilute aqueous sodium hydroxide and finally with water. The product [2-(o-chlorophenyl)-5-oxo-1,3-dithiane] weighed 8 g. A sample was recrystallized from absolute ethanol, M. P. 140°–141° C.

*Analysis.*—Calculated for $C_{10}H_9S_2ClO$: C, 49.07%; H, 3.71%; S, 26.20%; Cl, 14.49%. Found: C, 49.34%; H, 3.81%; S, 25.98%; Cl, 14.57%.

The 6-carboxy-8-(o-chlorophenyl)-1,4-dioxa-7,9-dithiaspiro[4.5]decane used above was prepared from the corresponding ester as follows:

To a hot solution of 72 g. (0.2 mole) of 4-ethoxycarbonyl-8-(o-chlorophenyl)-1,4-dioxa-7,9-dithiaspiro-[4.5]decane, prepared as described subsequently, in 200 ml. of ethanol was added a solution of 16 g. (0.64 mole) of sodium hydroxide in 40 ml. of water. Some solid formed, which slowly redissolved, then 200 ml. of water was added. After boiling on the steam bath to remove ethanol and to complete saponification, the mixture was cooled and acidified. There resulted a taffy-like material which was redissolved in sodium hydroxide and cooled. This caused the sodium salt of 6-carboxy-8-(o-chlorophenyl)-1,4-dioxa-7,9-dithiaspiro[4.5]decane to form. Twelve grams of this salt was collected. After recrystallization from water, it melted with decomposition at 269°–272.5° C.

*Analysis.*—Calculated for $C_{13}H_{12}S_2ClO_4Na$: S, 18.07%; Na, 6.5%. Found: S, 18.13%; Na, 6.5%.

The mother liquor from which the sodium salt was isolated was heated to 80° C., acidified, and cooled immediately. The product was recrystallized from ethanol to give 15 g. of a white solid, M. P. 190°–192° C. (dec.). A sample was recrystallized from ethanol and analyzed.

*Analysis.*—Calculated for $C_{13}H_{13}S_2O_4Cl$: S, 19.26%. Found: S, 18.91%.

Evaporation of the mother alcohol liquor, from which the above acid was recrystallized, gave an additional 46 g. of crude 6-carboxy-8-(o-chlorophenyl)-1,4-dioxa-7,9-dithiaspiro[4.5]decane.

The 4-ethoxycarbonyl-8-(o-chlorophenyl)-1,4-dioxa-7,9-dithiaspiro[4.5]decane was made as follows:

To a solution of 1 mole of sodium ethoxide dissolved in 400 ml. of absolute ethanol and 500 ml. of anhydrous ether at 0° C. was added 363 g. (1 mole) of diethyl-4-(o-chlorophenyl)-3,5-dithiapimelate, prepared as described subsequently, in one portion. The mixture was kept at 0° C. for eight hours and at room temperature for 12 hours. It was worked up by pouring into a mixture of 500 g. of ice, 500 ml. of water, and 120 ml. of concentrated hydrochloric acid. The organic layer was separated, washed with water, and dried over anhydrous magnesium sulfate. After removal of the ether, there remained 300 g. of clear red viscous liquid.

Crystallization was induced by dissolving the crude product in absolute ethanol, cooling in ice and scratching with a glass rod. The paste-like mass was ground with cold ethanol by means of a Waring Blendor. Cooling, filtering, and washing with cold ethanol, gave 175 g. of white solid [4-ethoxycarbonyl-5-oxo-2-(o-chlorophenyl)-1,3-dithiane], which, after recrystallization from ethanol, melted at 48°–49° C.

*Analysis.*—Calculated for $C_{13}H_{13}ClO_3S_2$: Cl, 11.19%; S, 20.24%. Found: Cl, 11.52%; S, 20.16%.

The diethyl 4-(o-chlorophenyl)-3,5-dithiapimelate used in the above example was prepared as follows:

Dry hydrogen chloride was bubbled through a mixture of 211 g. (1.5 moles) of o-chlorobenzaldehyde (freshly distilled) and 360 g. (3 moles) of ethyl mercaptoacetate until the temperature did not rise on further addition of hydrogen chloride. After standing for one hour, the product was taken up in ether, washed with water and 5% sodium hydroxide until the washings gave no oil on acidification. After washing once more with water, the product was dried over anhydrous magnesium sulfate, the ether was removed by distillation and the residue heated to 230° C. under 2.5 mm. pressure. There resulted 425 g. of diethyl 4-(o-chlorophenyl)-3,5-dithiapimelate.

*Analysis.*—Calculated for $C_{15}H_{19}ClO_4S_2$: Cl, 9.77%; S, 17.65%; M. W. 363. Found: Cl, 9.52%; S, 17.90%; M. W. 390, 386.

EXAMPLE III

A mixture of 50 ml of water, 0.5 ml. of concentrated hydrochloric acid, 25 g. of 6-carboxy-8,8-dimethyl-1,4-dioxa-7,9-dithiaspiro[4.5]decane, prepared as described below, was heated on a steam bath for 4 hours. Carbon dioxide was liberated slowly and the solid gradually went into solution. The mixture was cooled in an ice bath to give 12.1 g. of a liquid, 2,2-dimethyl-5-oxo-1,3-dithiane, boiling at 57.5°–59° C./0.5 mm. and having an $n_D^{25}$ of 1.5540.

*Analysis.*—Calculated for $C_6H_{10}S_2O$: C, 44.41%; H, 6.21%; S, 39.52%; M. W. 162. Found: C, 44.75%; H, 6.44%; S, 39.62%; M. W. 167, 168.

The 6-carboxy-8,8-dimethyl-1,4-dioxa-7,9-dithiaspiro[4.5]decane used in the above experiments was prepared as follows:

Sodium ethoxide was prepared by adding 27 g. (1.21 g. atom) of sodium metal to 450 ml. of absolute ethanol in a 3-necked, 3-liter flask fitted with a stirrer, condenser, and dropping funnel. When no sodium remained, the condenser was replaced by a thermometer. After 700 ml. of absolute diethyl ether had been added, the stirred mixture was cooled to 0° C.; then 340 g. (1.21 moles) of diethyl 4,4-dimethyl-3,5-dithiapimelate

[(CH₃)₂C(SCH₂COOEt)₂]

prepared as described subsequently, was added in one portion. The temperature was maintained at 0°–5° C. for 6 hours, and finally at room temperature overnight. The product was worked up by pouring into a water/hydrogen chloride/ice mixture and collected by ether extraction. The product was extracted from this ether solution with cold aqueous 5% sodium hydroxide until the extract did not become milky upon acidification. The cold sodium hydroxide extract was acidified and extracted with ether. After drying with magnesium sulfate, the ether was removed by distillation. There remained 260 g. of clear, pale yellow oil which could not be induced to solidify nor distilled without decomposition. The product gave a positive ketone test with 2,4-dinitrophenylhydrazine reagent.

The above product was suspended in 300 ml. of ethylene glycol, saturated with dry hydrogen chloride, and kept hot on the steam bath for one-half hour. On cooling, a viscous oil resulted which eventually solidified on cooling and scratching its glass container in the normal fashion with a glass rod. The free flowing white solid (6-ethoxycarbonyl-8,8-dimethyl-1,4-dioxa-7,9-dithiaspiro[4.5]decane) weighed 230 g., after washing with cold absolute ethanol and drying. A sample of the product was recrystallized from ethanol, M. P. 76°–77° C.

*Analysis.*—Calculated for $C_{11}H_{18}S_2O_4$: C, 47.46%; H, 6.49%; S, 23.03%. Found: C, 47.65%; H, 6.61%; S, 22.86%.

The diethyl-4,4-dimethyl-3,5-dithiapimelate used in the above experiment was prepared as follows:

Dry hydrogen chloride was passed through a mixture of 360 g. of ethyl mercaptoacetate and 93 g. of acetone at 10° C. The addition of hydrogen chloride was stopped when the mixture became homogeneous. After standing one hour at 25° C., the mixture was poured into an ice-water mixture and ether extracted. The ether extract was washed with 5% sodium hydroxide and water, dried over anhydrous magnesium sulfate, and the ether removed under vacuum. The product weighed 340 g. and had an $n_D^{25}$ of 1.4950.

The 5-oxo-1,3-dithianes of this invention comprise 5-oxo-1,3-dithiane itself, the 5-oxo-1,3-dithianes having a hydrocarbon substituent on a ring carbon and the 5-oxo-1,3-dithianes having a halohydrocarbon substituent on ring carbon, said halohydrocarbon substituent containing the halogen on a carbon which is linked to another carbon by a double bond, and this invention is generic to such 5-oxo-1,3-dithianes. The 5-oxo-1,3-dithianes hydrocarbon except for the 5 oxygen atom and the 1 and 3 sulfur atoms are preferred, i. e., those containing only carbon, hydrogen, the one oxygen on the 5 carbon, and the two sulfurs in the 1 and 3 positions. These include 5-oxo-1,3-dithiane itself and its hydrocarbon substitution products having not more than one hydrocarbon radical on the 4 and 6 carbons. The invention includes not only the specific 5-oxo-1,3-dithianes exemplified in detail above but also 4,6-di-n-propyl-5-oxo-1,3-dithiane, 4-ethyl-5-oxo-1,3-dithiane, 4-isobutyl-5-oxo-1,3-dithiane, and the like.

The 5-oxo-1,3-dithianes are readily obtained by decarboxylating and hydrolyzing the corresponding carboxy-substituted acetal dithianes which are prepared by the methods illustrated in the above examples. Further details are given in my concurrently filed application Serial No. 452,459.

The decarboxylation of the carboxylic acid dithiane acetal is conveniently effected at temperatures of from 80°–200° C. and the hydrolysis of the ketal linkage at temperatures up to 100° C. with mineral acid. Suitable mineral acids are hydrochloric, sulfuric, etc.

The 5-oxo-1,3-dithianes of this invention are useful chemical intermediates by virtue of their polyfunctional nature, i. e., they are active methylene compounds and ketones. They are also useful as rancidity inhibitors for vegetable oils, as illustrated below:

A 50% solution in benzene of a commercially available edible cottonseed oil was divided into two 2-gram portions. One portion was used as a control (no added agent), and to the other portion there was added 0.01 g. of 5-oxo-1,3-dithiane, i. e., 1% based on the weight of the oil. A clear solution was formed on gentle stirring. Separate pieces of filter paper were dipped into the control solution and the solution containing the added agent, blotted to remove excess solution, and dried in air at room temperature until all the benzene had evaporated (approximately 15 minutes). The weight of oil on the filter paper was about 0.25 g. in each case. The filter papers were placed in separate wide-mouth screw-top glass bottles, kept at 65° C., and examined daily for development of rancidity. The control developed rancidity in 4 days while the sample containing the 5-oxo-1,3-dithiane showed no rancidity development even after 13 days, under the same conditions.

The 5-oxo-1,3-dithianes of this invention are active carbonyl compounds as illustrated by Examples A to C.

EXAMPLE A

A mixture consisting of 1.34 g. (0.01 mole) of 5-oxo-1,3-dithiane, prepared as in Example I, 40 ml. of ethanol, and 25 ml. of water was heated until solution was complete. After cooling the solution to 30° C., 0.66 g. (0.01 mole) of malononitrile was added. In a few minutes a white solid began to form. The mixture was then warmed to 40° C. and permitted to cool slowly. After standing at room temperature for 4 days, the solid which formed was collected by filtration and dried. The product, 5-dicyanomethylene-1,3-dithiane, weighed 1.80 g. (99% of theory) and was creamed colored and crystalline. After recrystallization from ethanol, it melted at 179°–180.5° C.

*Analysis.*—Calculated for $C_7H_6S_2N_2$: C, 46.13%; H, 3.32%; S, 35.18%; N, 15.44%. Found: C, 46.42%, 46.45%; H, 3.50%, 3.63%; S, 35.43%; N, 15.47%, 15.51%.

EXAMPLE B

To a solution of 20.6 g. (0.1 mole) of 4-ethoxycarbonyl-5-oxo-1,3-dithiane, prepared as in the third part of Example I, in a mixture of 70 ml. of ethanol and 40 ml. of water at 60° C. there was added 6.6 g. (0.1 mole) of malononitrile. After cooling to room temperature, a yellow color developed and a solid separated. The solid, 5-di-cyanomethylene-4-ethoxycarbonyl-1,3-dithiane, was isolated and found to weigh 3 g. It was washed with cold benzene and recrystallized from ethanol.

*Analysis.*—Calculated for $C_{10}H_{10}S_2N_2O_2$: C, 47.22%; H, 3.96%; S, 25.21%; N, 11.02%. Found: C, 47.37%; H, 4.14%; S, 25.41%; N, 11.16%, 10.91%.

EXAMPLE C

A solution of 5.34 g. (0.04 mole) of 5-oxo-1,3-dithiane, prepared as in Example I, in 50 ml. of methanol and 50 ml. of water was heated on the steam bath. To the solution there was then added 3.46 g. (0.05 mole) of hydroxylamine hydrochloride. When solution was complete, 6.80 g. (0.05 mole) of sodium acetate trihydrate in 10 ml. of water was added. The mixture was filtered immediately and cooled slowly to obtain 4 g. of white, solid 5-isonitroso-1,3-dithiane. Evaporation of the mother liquor to 15 ml. gave 0.1 g. more of oxime or a total yield of 4.1 g. (69% of theory). After recrystallization from a water-alcohol mixture, the solid melted at 166°–167° C.

*Analysis.*—Calculated for $C_4H_7S_2NO$: C, 32.19%; H, 4.73%; S, 32.97%; N, 9.39%. Found: C, 32.42%, 32.88%, 32.84%; H, 4.80%, 4.86%, 4.84%; S, 32.13%; N, 9.42%; 9.49%.

The above 5-isonitroso-1,3-dithiane was reduced to the amine as follows:

To a flask fitted with condenser, nitrogen inlet tube, dropping funnel, and stirrer; there was added 100 ml. of sodium dried absolute ether and 3.8 g. (0.01 mole) of lithium aluminum hydride. The mixture was stirred and blanketed with nitrogen. A solution of 3.18 g. (0.0214 mole) of the 5-isonitroso-1,3-dithiane, prepared as above in 25 ml. of pure tetrahydrofuran, was then added cautiously. After the addition was complete, the mixture was refluxed and stirred for 7 hours. The lithium aluminum hydride was destroyed by cautiously adding a mixture of water, ethanol and ether. The mixture became very white. It was filtered, and the solid washed with ether. The ether was removed by vacuum distillation. There resulted a pale yellow solid, 5-amino-1,3-dithiane, which, after recrystallation from petroleum ether, weighed 1.5 g. (52% of theory) and melted at 78°–79° C. with sublimation, beginning at about 50° C. The sample was once more recrystallized for analysis.

*Analysis.*—Calculated for $C_4H_9S_2N$: C, 35.52%; H, 6.71%; S, 47.41%; N, 10.36%. Found: C, 36.65%, 36.41%, 36.47%; H, 6.73%, 6.86%, 6.89%; S, 47.04%; N, 9.84%, 10.07%.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A member of the class consisting of 5-oxo-1,3-dithiane and its saturated monovalent hydrocarbon and chlorophenyl substitution products on ring carbons wherein the substituent has no more than one ring.

2. A member of the class consisting of 5-oxo-1,3-dithiane and its saturated monovalent hydrocarbon and chlorophenyl substitution products on the 2, 4, and 6 carbons wherein the substituent has no more than one ring with the proviso that there be at most one such substitution on each of the 4, and 6 carbons.

3. 5-oxo-1,3-dithiane.

4. A 5-oxo-1,3-dithiane containing a saturated monovalent, at most monocyclic hydrocarbon substituent on at least one of 4 and 6 carbon atoms and having hydrogen on each of the 4 and 6 carbons.

5. A 5-oxo-1,3-dithiane wholly saturated hydrocarbon except for the oxygen on the 5 carbon and two sulfurs in the 1 and 3 positions and having at least one hydrogen on each of the 4 and 6 carbons, any substituent having no more than one ring.

6. A 1,3-dithiane having hydrogen on each of the 4 and 6 carbons and wholly saturated hydrocarbon except for the two ring sulfurs and an exocyclic group doubly bonded to the 5 carbon of the ring, said exocyclic group being selected from the class consisting of $=O$, $=NOH$, and $=C(CN)_2$, any substituent having no more than one ring.

7. A 5-oxo-1,3-dithiane having, as its only substituents, in addition to the oxo oxygen, a lower alkyl group.

References Cited in the file of this patent

UNITED STATES PATENTS 2,493,071    Kendall et al. _____ Jan. 3, 1950

OTHER REFERENCES

Challenger et al.: J. Chem. Soc. 1939, 347–8.